United States Patent
Ji et al.

(10) Patent No.: US 10,362,548 B2
(45) Date of Patent: Jul. 23, 2019

(54) SYNCHRONIZATION SIGNAL TRANSMISSION METHOD AND APPARATUS

(71) Applicant: HUAWEI TECHNOLOGIES CO., LTD., Shenzhen, Guangdong (CN)

(72) Inventors: Tong Ji, Beijing (CN); Yiling Wu, Beijing (CN); Zhe Chen, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 15/933,100

(22) Filed: Mar. 22, 2018

(65) Prior Publication Data
US 2018/0220387 A1    Aug. 2, 2018

Related U.S. Application Data

(63) Continuation of application No. PCT/CN2015/093386, filed on Oct. 30, 2015.

(30) Foreign Application Priority Data

Sep. 24, 2015    (WO) ................ PCT/CN2015/090611

(51) Int. Cl.
*H04J 11/00* (2006.01)
*H04W 56/00* (2009.01)
(Continued)

(52) U.S. Cl.
CPC ............ *H04W 56/001* (2013.01); *H04J 11/00* (2013.01); *H04L 27/2613* (2013.01);
(Continued)

(58) Field of Classification Search
CPC ............................ H04W 56/001; H04W 4/70; H04W 72/0453; H04W 72/082; H04W 56/00;
(Continued)

(56) References Cited

U.S. PATENT DOCUMENTS

2008/0101507 A1    5/2008    Oketani et al.
2010/0296429 A1*   11/2010   Han .................. H04L 12/189
                                                        370/312
(Continued)

FOREIGN PATENT DOCUMENTS

CN    101409584 A    4/2009
CN    102271108 A    12/2011
(Continued)

OTHER PUBLICATIONS

XP050996054 3GPP TR 45.820 V13.0.0 (Aug. 2015),3rd Generation Partnership Project;Technical Specification Group GSM/EDGE Radio Access Network;Cellular system support for ultra-low complexity and low throughput Internet of Things (CIoT)(Release 13),total 495 pages.

(Continued)

*Primary Examiner* — Dac V Ha
(74) *Attorney, Agent, or Firm* — Fish & Richardson P.C.

(57) ABSTRACT

The present disclosure relates to the mobile communications field, and in particular, to a synchronization signal sending method. A network device obtains a first signal after performing discrete Fourier transform (DFT) and orthogonal frequency division multiplexing (OFDM) modulation, or OFDM modulation on a Zadoff-Chu (ZC) sequence whose root index is 1. The network device obtains a second signal after performing DFT and OFDM modulation, or OFDM modulation on a conjugate sequence of the ZC sequence whose root index is 1. The network device generates a synchronization signal, where the synchronization signal includes the first signal and the second signal. The network device sends the synchronization signal to a terminal device.

20 Claims, 10 Drawing Sheets

(51) Int. Cl.
*H04W 4/70* (2018.01)
*H04L 27/26* (2006.01)
*H04W 72/04* (2009.01)
*H04W 72/08* (2009.01)
*H04J 13/00* (2011.01)

(52) U.S. Cl.
CPC ...... *H04L 27/2628* (2013.01); *H04L 27/2643* (2013.01); *H04L 27/2657* (2013.01); *H04L 27/2659* (2013.01); *H04L 27/2662* (2013.01); *H04L 27/2663* (2013.01); *H04L 27/2666* (2013.01); *H04L 27/2675* (2013.01); *H04W 4/70* (2018.02); *H04W 56/00* (2013.01); *H04W 72/0453* (2013.01); *H04W 72/082* (2013.01); *H04J 13/00* (2013.01); *H04J 2011/0096* (2013.01)

(58) Field of Classification Search
CPC ......... H04L 27/2643; H04L 27/272657; H04L 27/2613; H04L 27/2659; H04L 27/2628; H04L 27/2663; H04L 27/2666; H04L 27/2675; H04L 27/2662; H04J 11/00; H04J 2011/0096; H04J 13/00
See application file for complete search history.

(56) References Cited

U.S. PATENT DOCUMENTS

| | | |
|---|---|---|
| 2012/0021689 A1 | 1/2012 | Han |
| 2012/0314561 A1 | 12/2012 | Xie et al. |
| 2013/0195212 A1 | 8/2013 | Wang et al. |
| 2014/0169326 A1 | 6/2014 | Levanen et al. |
| 2014/0211752 A1 | 7/2014 | Berggren et al. |
| 2015/0312026 A1* | 10/2015 | Kim ............... H04W 56/00 370/338 |
| 2016/0270015 A1* | 9/2016 | Lin ............. H04W 56/0025 |
| 2017/0273041 A1* | 9/2017 | Seo .................. H04J 11/00 |

FOREIGN PATENT DOCUMENTS

| | | | |
|---|---|---|---|
| CN | 102396253 A | | 3/2012 |
| CN | 103326982 A | | 9/2013 |
| CN | 103814560 A | | 5/2014 |
| CN | 104125188 A | | 10/2014 |
| CN | 104320367 A | | 1/2015 |
| EP | 2406978 B1 | | 11/2012 |
| WO | 2009047732 A2 | | 4/2009 |

OTHER PUBLICATIONS

KP051021919 R1-155960 Huawei, HiSilicon, "Synchronization Signal Design",3GPP TSG RAN WG1 Meeting #82bis, Malmo, Sweden, Oct. 5-9, 2015,total 7 pages.
Extended European Search Report issued in European Application No. 159045901.3 dated Aug. 14, 2018, 6 pages.
Sun Hu et al.,"Algorithm to estimate OFDM synchronization and sparse channels by ZC sequences",Journal of Huazhong University of Science and Technology(Natural Science Edition),vol. 41,No. 10,Oct. 2013,total 5 pages.
International Search Report issued in International Application No. PCT/CN2015/090611 dated May 27, 2016, 4 pages.
International Search Report issued in International Application No. PCT/CN2015/093386 dated Jun. 24, 2016, 12 pages.
Chinese Office Action issued in Chinese Application No. 201580077737.6 dated May 20, 2019, 5 pages.
Chinese Search Report issued in Chinese Application No. 2015800777376 dated May 9, 2019, 2 pages.

* cited by examiner

SYNCHRONIZATION SIGNAL TRANSMISSION METHOD AND APPARATUS

CROSS-REFERENCE TO RELATED APPLICATION

This application is a continuation of International Application No. PCT/CN2015/093386, filed on Oct. 30, 2015, which claims priority to International Application No. PCT/CN2015/090611, filed on Sep. 24, 2015. The disclosures of the aforementioned applications are hereby incorporated by reference in their entireties.

TECHNICAL FIELD

The present invention relates to the field of wireless communications technologies, and in particular, to a synchronization signal transmission method and an apparatus.

BACKGROUND

With rapid expansion of a machine-to-machine (machine to machine, M2M) communications application, an M2M market has witnessed explosive growth in demand and scale. Therefore, a terminal device of an M2M service faces a challenge of low power consumption and low costs. Therefore, when a synchronization solution is designed, power consumption and costs, that is, a delay and complexity need to be minimized.

However, due to costs limitation, crystal oscillator precision of an M2M terminal is usually relatively low. This causes a relatively large frequency offset in the terminal device relative to a network device (for example, a base station), and the frequency offset causes a continuous phase change of a signal in a time domain. Therefore, an existing synchronization technology cannot meet an M2M service requirement in the case of the relatively large frequency offset.

An application environment of an M2M communications technology is usually a basement or a remote area. Therefore, a requirement for deep coverage or wide coverage needs to be met. Therefore, a signal-to-noise ratio of an environment in which the M2M terminal is located is relatively poor, and in an existing manner, a problem of the poor signal-to-noise ratio is resolved by ensuring a sufficient sequence length. In addition, a frequency resource of an M2M communications system is also limited, a length of a synchronization sequence generated in an existing LTE synchronization signal generation method on a limited frequency resource is quite limited, and an M2M requirement for resisting a low signal-to-noise ratio environment cannot be met.

SUMMARY

Embodiments of the present invention provide a synchronization signal transmission method, and a device, so that when there is a relatively large frequency offset between a terminal device and a network device, an M2M service requirement can still be met.

According to an aspect, an embodiment of this application provides a synchronization signal sending method, including: obtaining, by a network device, a first signal after performing discrete Fourier transform DFT and orthogonal frequency division multiplexing OFDM modulation, or OFDM modulation on a ZC sequence whose root index is 1; obtaining, by the network device, a second signal after performing DFT and OFDM modulation, or OFDM modulation on a conjugate sequence of the ZC sequence whose root index is 1;

generating, by the network device, a synchronization signal, where the synchronization signal includes the first signal and the second signal; and sending, by the network device, the synchronization signal to a terminal device.

In a possible design, the obtaining, by a network device, a first signal after performing DFT and OFDM modulation on a ZC sequence whose root index is 1 includes: dividing the ZC sequence whose root index is 1 into N subsequences, performing DFT and OFDM modulation on each of the N subsequences, and splicing the modulated N subsequences into the first signal.

In another possible design, the performing DFT and OFDM modulation on each of the N subsequences, and splicing the modulated N subsequences into the first signal includes: performing discrete Fourier transform on each subsequence to obtain a frequency subdomain signal corresponding to each subsequence; performing inverse discrete Fourier transform on the frequency subdomain signal corresponding to each subsequence to obtain a time subdomain signal corresponding to each frequency subdomain signal; adding a CP to the time subdomain signal corresponding to each frequency subdomain signal to obtain a sub-signal corresponding to each time subdomain signal; and splicing all sub-signals into the first signal.

In another possible design, the obtaining, by a network device, a first signal after performing OFDM modulation on a ZC sequence whose root index is 1 includes: performing inverse discrete Fourier transform on the ZC sequence whose root index is 1 to obtain a corresponding time-domain signal; and adding a CP to the time-domain signal to obtain the first signal.

In another possible design, the obtaining, by the network device, a second signal after performing DFT and OFDM modulation on a conjugate sequence of the ZC sequence whose root index is 1 includes: dividing the conjugate sequence of the ZC sequence whose root index is 1 into N subsequences, performing DFT and OFDM modulation on each of the N subsequences, and splicing the modulated N subsequences into the second signal.

In another possible design, the performing DFT and OFDM modulation on each of the N subsequences, and splicing the modulated N subsequences into the second signal includes: performing discrete Fourier transform on each subsequence to obtain a frequency subdomain signal corresponding to each subsequence; performing inverse discrete Fourier transform on the frequency subdomain signal corresponding to each subsequence to obtain a time subdomain signal corresponding to each frequency subdomain signal; adding a CP to the time subdomain signal corresponding to each frequency subdomain signal to obtain a sub-signal corresponding to each time subdomain signal; and splicing all sub-signals into the second signal.

In another possible design, the obtaining, by the network device, a second signal after performing OFDM modulation on a conjugate sequence of the ZC sequence whose root index is 1 includes: performing inverse discrete Fourier transform on the conjugate sequence of the ZC sequence whose root index is 1 to obtain a corresponding time-domain signal; and adding a CP to the time-domain signal to obtain the second signal.

According to another aspect, an embodiment of this application provides a synchronization signal receiving method, including: receiving, by a terminal device, a synchronization signal sent by a network device, where the synchronization signal includes a first signal and a second signal, the first signal is obtained after the network device performs discrete Fourier transform DFT and orthogonal frequency division multiplexing OFDM modulation, or OFDM modulation on a ZC sequence whose root index is 1, and the second signal is obtained after the network device performs DFT and OFDM modulation, or OFDM modulation on a conjugate sequence of the ZC sequence whose root index is 1; and performing, by the terminal device, symbol timing synchronization and carrier frequency synchronization according to the ZC sequence whose root index is 1, the conjugate sequence of the ZC sequence whose root index is 1, and the synchronization signal.

In a possible design, the performing, by the terminal device, symbol timing synchronization and carrier frequency synchronization according to the ZC sequence whose root index is 1, the conjugate sequence of the ZC sequence whose root index is 1, and the synchronization signal includes: performing sliding correlation on the synchronization signal by using the ZC sequence whose root index is 1, and obtaining a first sliding correlation peak; performing sliding correlation on the synchronization signal by using the conjugate sequence of the ZC sequence whose root index is 1, and obtaining a second sliding correlation peak; determining a start location of the first signal according to a location of the first sliding correlation peak and a location of the second sliding correlation peak, and completing the symbol timing synchronization; and determining a carrier frequency offset value according to the location of the first sliding correlation peak and the start location of the first signal, and completing the carrier frequency synchronization.

In another possible design, the determining a start location of the first signal according to a location of the first sliding correlation peak and a location of the second sliding correlation peak includes: determining a middle point location between the location of the first sliding correlation peak and the location of the second sliding correlation peak; determining a distance between an ideal start location of the first signal and an ideal start location of the second signal; and determining the start location of the first signal according to the middle point location and the distance.

According to another aspect, an embodiment of this application provides a network device, including: a processing module, configured to: obtain a first signal after performing discrete Fourier transform DFT and orthogonal frequency division multiplexing OFDM modulation, or OFDM modulation on a ZC sequence whose root index is 1, obtain a second signal after performing DFT and OFDM modulation, or OFDM modulation on a conjugate sequence of the ZC sequence whose root index is 1, and generate a synchronization signal, where the synchronization signal includes the first signal and the second signal; and a sending module, configured to send, to a terminal device, the synchronization signal generated by the processing module.

In a possible design, the processing module is specifically configured to: divide the ZC sequence whose root index is 1 into N subsequences, perform DFT and OFDM modulation on each of the N subsequences, and splice the modulated N subsequences into the first signal.

In another possible design, the first signal is obtained by the processing module in the following manner: performing discrete Fourier transform on each subsequence to obtain a frequency subdomain signal corresponding to each subsequence; performing inverse discrete Fourier transform on the frequency subdomain signal corresponding to each subsequence to obtain a time subdomain signal corresponding to each frequency subdomain signal; adding a CP to the time subdomain signal corresponding to each frequency subdomain signal to obtain a sub-signal corresponding to each time subdomain signal; and splicing all sub-signals into the first signal.

In another possible design, the network device is specifically configured to: perform inverse discrete Fourier transform on the ZC sequence whose root index is 1 to obtain a corresponding time-domain signal; and add a CP to the time-domain signal to obtain the first signal.

In another possible design, the processing module is specifically configured to: divide a conjugate sequence of the ZC sequence whose root index is 1 into N subsequences, perform DFT and OFDM modulation on each of the N subsequences, and splice the modulated N subsequences into the second signal.

In another possible design, the second signal is obtained by the processing module in the following manner:

performing discrete Fourier transform on each subsequence to obtain a frequency subdomain signal corresponding to each subsequence; performing inverse discrete Fourier transform on the frequency subdomain signal corresponding to each subsequence to obtain a time subdomain signal corresponding to each frequency subdomain signal; adding a CP to the time subdomain signal corresponding to each frequency subdomain signal to obtain a sub-signal corresponding to each time subdomain signal; and splicing all sub-signals into the second signal.

In another possible design, the processing module is specifically configured to: perform inverse discrete Fourier transform on the conjugate sequence of the ZC sequence whose root index is 1 to obtain a corresponding time-domain signal; and add a CP to the time-domain signal to obtain the second signal.

According to another aspect, an embodiment of this application provides a terminal device, including: a receiving module, configured to receive a synchronization signal sent by a network device, where the synchronization signal includes a first signal and a second signal, the first signal is obtained after the network device performs discrete Fourier transform DFT and orthogonal frequency division multiplexing OFDM modulation, or OFDM modulation on a ZC sequence whose root index is 1, and the second signal is obtained after the network device performs DFT and OFDM modulation, or OFDM modulation on a conjugate sequence of the ZC sequence whose root index is 1; and a processing module, configured to perform symbol timing synchronization and carrier frequency synchronization according to the ZC sequence whose root index is 1, the conjugate sequence of the ZC sequence whose root index is 1, and the synchronization signal.

In a possible design, the processing module is specifically configured to: perform sliding correlation on the synchronization signal by using the ZC sequence whose root index is 1, and obtain a first sliding correlation peak; perform sliding correlation on the synchronization signal by using the conjugate sequence of the ZC sequence whose root index is 1, and obtain a second sliding correlation peak; determine a start location of the first signal according to a location of the first sliding correlation peak and a location of the second sliding correlation peak, and complete the symbol timing synchronization; and determine a carrier frequency offset value according to the location of the first sliding correlation peak and the start location of the first signal, and complete the carrier frequency synchronization.

In another possible design, that the processing module determines a start location of the first signal according to a location of the first sliding correlation peak and a location of the second sliding correlation peak is specifically: determining a middle point location between the location of the first sliding correlation peak and the location of the second sliding correlation peak; determining a distance between an ideal start location of the first signal and an ideal start location of the second signal; and determining the start location of the first signal according to the middle point location and the distance.

According to the synchronization signal transmission method and the apparatus in the embodiments of the present invention, the network device obtains the first signal after performing DFT and OFDM modulation, or OFDM modulation on the ZC sequence whose root index is 1, obtains the second signal after performing DFT and OFDM modulation, or OFDM modulation on the conjugate sequence of the ZC sequence whose root index is 1, and then generates the synchronization signal, where the synchronization signal includes the first signal and the second signal. That is, the generated synchronization signal includes the ZC sequence whose root index is 1 and the conjugate sequence of the ZC sequence whose root index is 1. The terminal device receives the synchronization signal according to a characteristic of the ZC sequence whose root index is 1, and the terminal device may perform, according to the synchronization signal and an auto-correlation and a frequency offset resistance characteristic of the ZC sequence whose root index is 1, the symbol timing synchronization and the carrier frequency synchronization in the case of a large frequency offset, thereby completing synchronization work of an M2M communications system in the case of the large frequency offset.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figure 1:
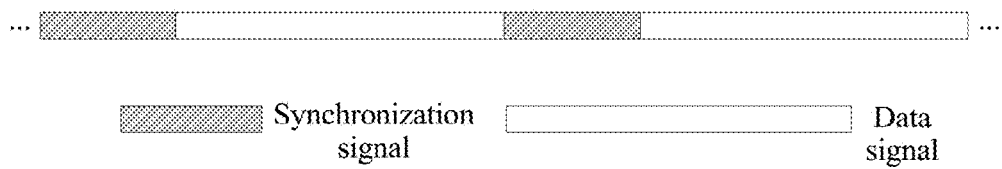
FIG. 1 is a structural diagram of a signal sending format in the prior art.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Although an LTE system is used as an example for description in the foregoing background part, a person skilled in the art should know that the present invention is not only applicable to the LTE system, but may also be applicable to another wireless communications system, such as a Global System for Mobile Communications (Global System for Mobile Communications, GSM), a Universal Mobile Telecommunications System (Universal Mobile Telecommunications System, UMTS), Code Division Multiple Access (Code Division Multiple Access, CDMA), and a new network system. The following describes specific embodiments by using the LTE system as an example.

A terminal device provided in embodiments of the present invention may refer to a device that provides a user with voice and/or data connectivity, a handheld device that has a wireless connection function, or another processing device connected to a wireless modem. The wireless terminal may communicate with one or more core networks by using a radio access network (radio access network, RAN). The wireless terminal may be a mobile terminal such as a mobile phone (or referred to as a "cellular" phone), or a computer that has a mobile terminal. For example, the wireless terminal may be a portable, pocket-sized, handheld, computer built-in, or in-vehicle mobile apparatus, and exchanges voice and/or data with the radio access network. For example, the wireless terminal may be a device such as a personal communications service (personal communications service, PCS) phone, a cordless phone, a Session Initiation Protocol (SIP) phone, a wireless local loop (wireless local loop, WLL) station, or a personal digital assistant (personal digital assistant, PDA). The wireless terminal may also be referred to as a system, a subscriber unit, a subscriber station, a mobile station, a mobile terminal (Mobile), a remote station, an access point, a remote terminal, an access terminal, a user terminal, a user agent, a user device, or user equipment.

A network device provided in the embodiments of the present invention may be a base station (for example, an access point), or may refer to a device that is in an access network and that communicates, over an air interface, with a wireless terminal by using one or more sectors. The base station may be configured to mutually convert a received over-the-air frame and an IP packet and serve as a router between the wireless terminal and a remaining portion of the access network. The remaining portion of the access network may include an Internet Protocol (IP) network. The base station may further coordinate attribute management of the air interface. For example, the base station may be a base transceiver station (base transceiver station, BTS) in GSM or CDMA, may be a NodeB (NodeB) in WCDMA, or may be an evolved NodeB (eNB or eNodeB, evolved Node B) in LTE. This is not limited in this application.

In a communications system, after accessing a network, the terminal device needs to first perform synchronization with the network device. Generally, synchronization includes time synchronization and frequency synchronization, where the time synchronization may be symbol timing synchronization, and the frequency synchronization may be carrier frequency synchronization. The symbol timing synchronization is a process in which the terminal device obtains a start location of a signal. For example, when the network device sends the signal according to a format shown in FIG. 1, if the terminal device still does not obtain the symbol timing synchronization, after receiving the foregoing signal, the terminal device only recognizes a series of signal, cannot determine the start location of the signal, and cannot determine a demarcation location of a synchronization signal and another signal.

Therefore, the terminal device needs to determine the start location of the signal by using the symbol timing synchronization. A conventional symbol timing synchronization practice is as follows: A sequence with an auto-correlation is used as the synchronization signal, and the terminal device determines the start location of the signal by using a location of an auto-correlation peak.

The synchronization further includes the carrier frequency synchronization. However, because there is an inherent error in a crystal oscillator of a terminal device component, the signal received by the terminal device has a frequency offset relative to the signal sent by the network device. The carrier frequency synchronization is a process in which the terminal device estimates and corrects the frequency offset. Usually, a time of the carrier frequency synchronization is after the symbol timing synchronization, for example, the carrier frequency synchronization may be implemented by means of phase coherence, raster search, or the like, and details are not described herein.

In an existing LTE technology, a synchronization signal includes a primary synchronization signal (primary synchronization signal, PSS) and a secondary synchronization signal (secondary synchronization signal, SSS). The PSS is mainly used to perform initial symbol timing synchronization and initial carrier frequency synchronization, and the SSS is mainly used to perform cell detection, frame synchronization, CP detection, or the like.

The PSS is a ZC sequence, different cells are distinguished by using ZC sequences with different root indexes. For example, in the LTE system, the network device classifies the primary synchronization signal into three groups, and the three groups respectively use a ZC sequence whose root index is u=29, 34, 25: $zc(n)=e^{-j\pi un(n+1)/63}$, u=29, 34, 25. The terminal device may determine, according to a cross correlation between ZC sequences with different root indexes, a group to which a cell of the terminal device belongs.

Figure 2:
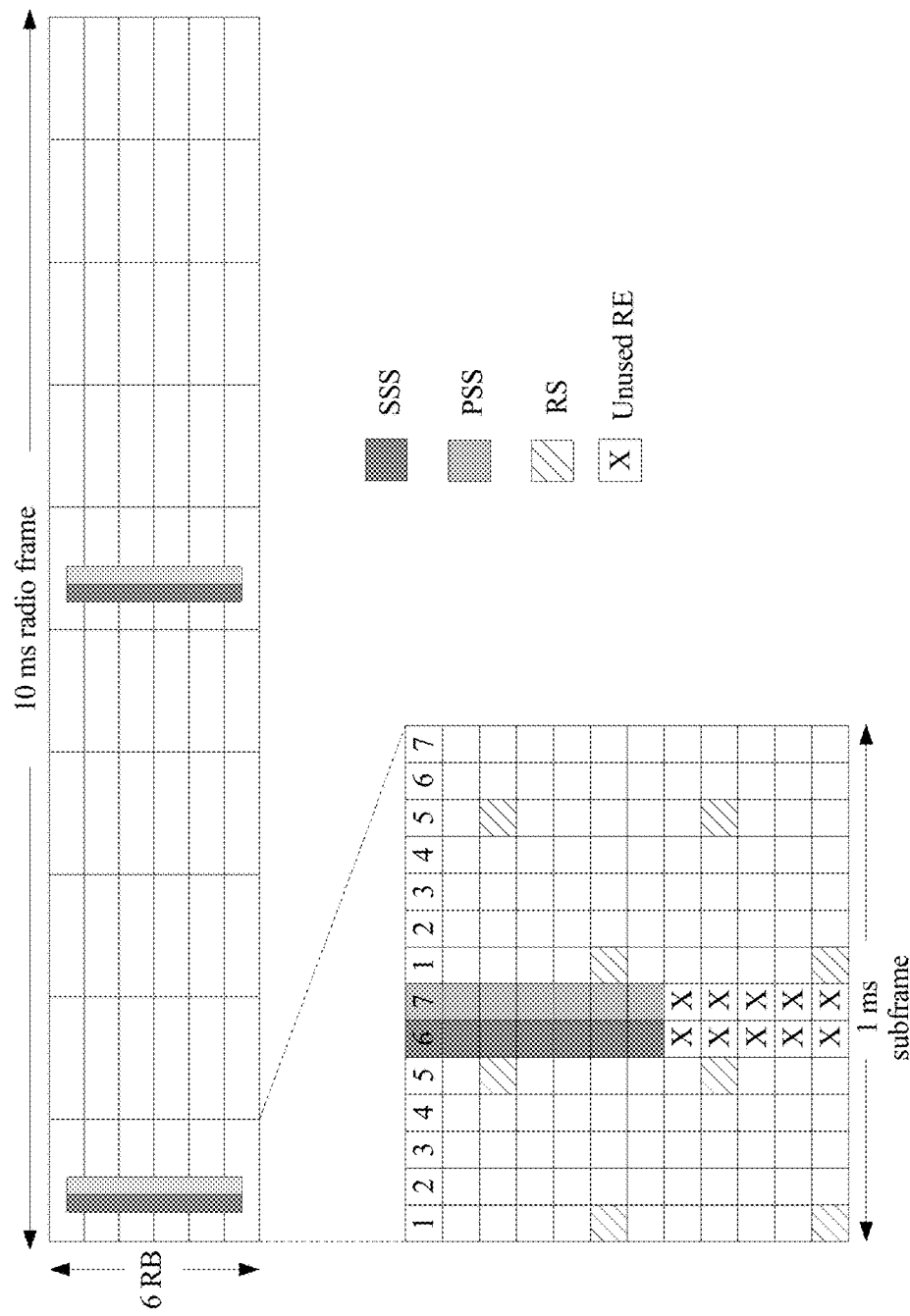
FIG. 2 is a schematic diagram of a synchronization signal time-frequency structure of an LTE system in the prior art.

As shown in FIG. 2, an LTE synchronization signal occupies six resource blocks (resource block, RB) in a middle of a spectrum, and occupies one orthogonal frequency division multiplexing (orthogonal frequency division multiplexing, OFDM) symbol in a time domain, and the network device periodically sends the synchronization signal to the terminal device. A sequence of the synchronization signal is directly generated in a frequency domain, and is modulated, by using an OFDM modulation scheme, to a subcarrier corresponding to the synchronization signal, and then a time-domain signal generated by means of inverse discrete Fourier transform (inverse discrete Fourier transform, IDFT) is sent.

Figure 3:
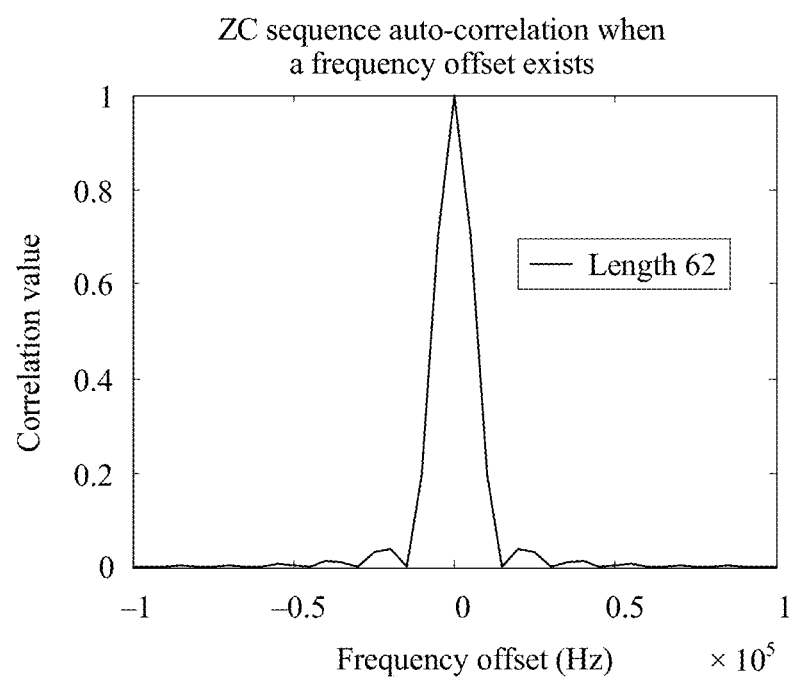
FIG. 3 is a schematic diagram in which an auto-correlation of an LTE synchronization sequence is affected by a frequency offset in the prior art.

On the one hand, in an M2M system, due to costs limitation, crystal oscillator precision of the terminal device in an M2M is usually relatively low. This causes a relatively large frequency offset in the signal received by the terminal device relative to the signal sent by the network device. The frequency offset causes a continuous phase change of the received signal in the time domain, significantly affecting a correlation of the sequence. A PSS sequence used in LTE is used as an example. When a sampling frequency is 960 kHz, changes of a correlation peak value in the case of different frequency offsets are shown in FIG. 3. It can be seen that, the auto-correlation peak is quite small when the frequency offset exceeds 3 to 4 kHz. A relatively common terminal crystal oscillator indicator in the M2M industry is 20 PPM. According to calculation by using a carrier frequency 2 GHz of LTE, an initial frequency offset is 2 G×20 PPM=40 kHz, which is far greater than 3 to 4 kHz. A sequence used by the synchronization signal is no longer applicable to the M2M system.

On the other hand, besides that the sequence used by the synchronization signal cannot effectively resist a large frequency offset, a manner of generating an LTE synchronization signal is limited. A method for generating the synchronization signal in the frequency domain is used in LTE, and to keep orthogonality with a data signal, a subcarrier spacing uses 15 kHz. However, system bandwidth occupied by the M2M is usually relatively small. For example, if the M2M occupies one RB in LTE, that is, 180 kHz, only a sequence with a maximum length of 180/15=12 can be used. The length is too short to meet a performance requirement. If a plurality of symbols are occupied, the auto-correlation of the synchronization sequence is lost, and synchronization work cannot be performed.

To better understand the technical solutions of the present invention, the following describes some related knowledge about the sequence:

According to a definition of a correlation value of two sequences in a communications subject, the two sequences are respectively set as $A=\{a_i\}_{i=1}^n$ and $B=\{b_i\}_{i=1}^n$, and the correlation value of the two sequences is defined as $$\text{Corr}(A, B) = \|\sum_{i=1}^n a_i b_i^*\|^2 \cdot \|\sum_{i=1}^n a_i b_i^*\|$$

represents a modulus value of $$\sum_{i=1}^{n} a_i b_i^*,$$

and $b^*_i$ represents a conjugate of $b_i$. For ease of expression, Corr(A,B) is used to represent a correlation value of a sequence A and a sequence B in this specification.

According to a definition of a sliding correlation peak in the communications subject, a sliding correlation operation usually occurs between a sequence and a segment of a signal, and a signal length is usually greater than or equal to a sequence length. A sequence is set as $S=\{s_i\}_{i=1}^{n}$, and a signal is set as $R=\{r_i\}_{i=1}^{N}$, $N \geq n$. The sequence S performs sliding correlation on the signal R and an obtained sliding correlation peak is:

Corr_Peak(R,S)=max/i(Corr(R(i+1:i+n), S)), where R(i+1:i+n) represents a sub-signal formed by an $(i+1)^{th}$ signal value of the signal R to an $(i+n)^{th}$ signal value of the signal R. That is, the sliding correlation peak value obtained by the sequence S performing the sliding correlation on the signal R is: a maximum value of correlation values of the sequence S and various segments of sub-signals of the signal R. For ease of expression, Corr_Peak (R,S) is used to represent the sliding correlation peak value obtained by the sequence S performing the sliding correlation on the signal R in this specification.

Figure 5:
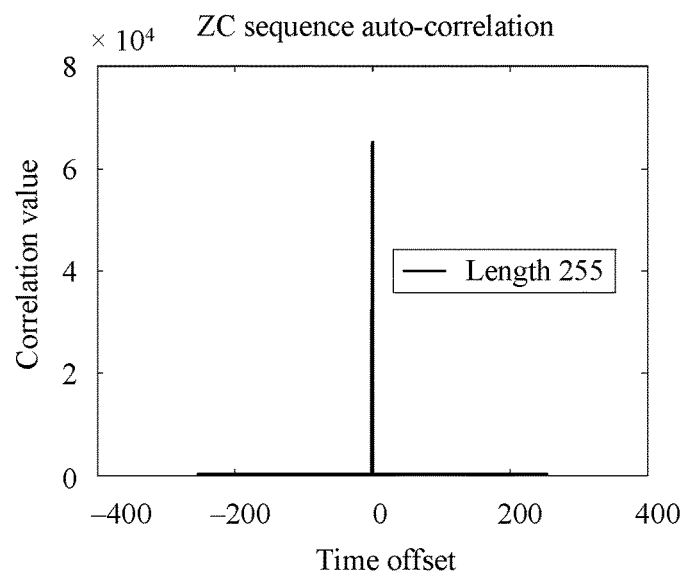
FIG. 5 is a schematic diagram of an auto-correlation of a ZC sequence according to an embodiment of the present invention.

According to a definition of a sequence with a good auto-correlation in the communications subject, a sequence is set as $S=\{s_i\}_{i=1}^{n}$, and the sequence S with the good auto-correlation means that the sequence S meets Corr(S, $S^\tau$)=Corr(S,S), where $S^\tau$ is a sequence S with a delay $\tau$:$S^\tau=\{s_{(i+\tau) \bmod n}\}_{i=1}^{n}$, and x mod y represents that x performs a modulo operation on y. That is, if a sequence has the good auto-correlation, when the sequence performs the correlation with the sequence, a relatively large correlation peak value can be generated only when elements of the sequence are completely aligned (that is, without a delay). For example, it may be seen from a schematic diagram of an auto-correlation of a Zadoff-Chu (ZC) sequence shown in FIG. 5, when there is no delay in the sequence, a relatively large correlation peak value is generated, and when there is a delay, a generated correlation value is extremely small. Therefore, the ZC sequence is the sequence with the good auto-correlation.

Figure 4:
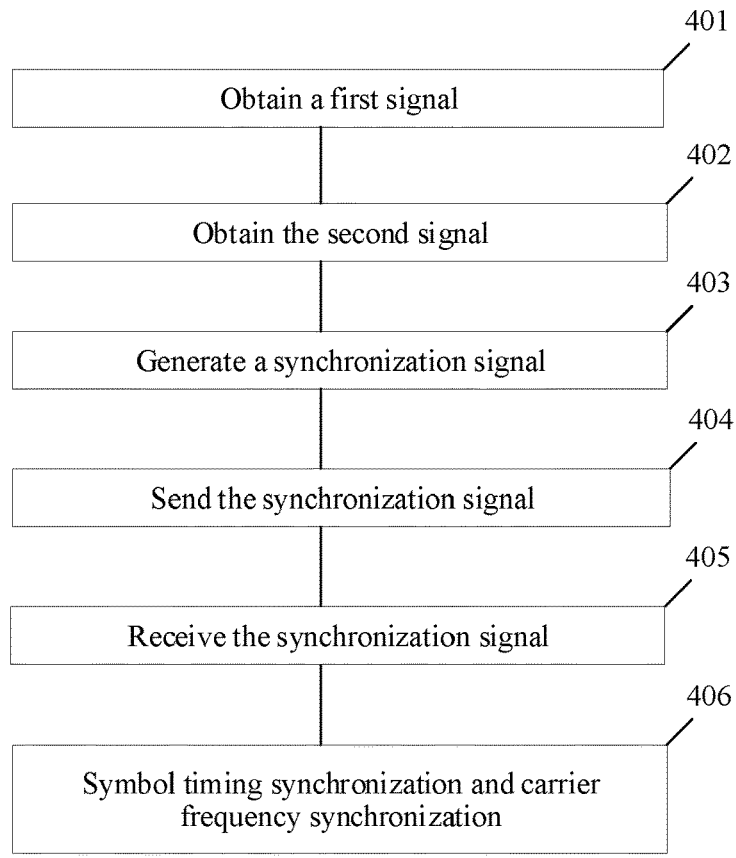
FIG. 4 is a schematic flowchart of a synchronization method according to an embodiment of the present invention.

To resolve the foregoing technical problem, the embodiments of the present invention provide the following solutions:

As shown in FIG. 4, an embodiment of the present invention provides a synchronization signal sending method, including the following steps.

401. A network device obtains a first signal after performing discrete Fourier transform DFT and orthogonal frequency division multiplexing OFDM modulation, or OFDM modulation on a ZC sequence whose root index is 1.

402. The network device obtains a second signal after performing DFT and OFDM modulation, or OFDM modulation on a conjugate sequence of the ZC sequence whose root index is 1.

403. The network device generates a synchronization signal, where the synchronization signal includes the first signal and the second signal.

404. The network device sends the synchronization signal to a terminal device.

405. The terminal device receives the synchronization signal sent by the network device, where the synchronization signal includes the first signal and the second signal.

The first signal is obtained after the network device performs discrete Fourier transform DFT and orthogonal frequency division multiplexing OFDM modulation, or OFDM modulation on the ZC sequence whose root index is 1, and the second signal is obtained after the network device performs DFT and OFDM modulation, or OFDM modulation on the conjugate sequence of the ZC sequence whose root index is 1.

406. The terminal device performs symbol timing synchronization and carrier frequency synchronization according to the ZC sequence whose root index is 1, the conjugate sequence of the ZC sequence whose root index is 1, and the synchronization signal.

It should be specially noted that there is no sequence for performing step 401 and step 402, and details are not described herein again.

According to the synchronization signal transmission method and the apparatus in this embodiment of the present invention, the network device obtains the first signal after performing DFT and OFDM modulation, or OFDM modulation on the ZC sequence whose root index is 1, obtains the second signal after performing DFT and OFDM modulation, or OFDM modulation on the conjugate sequence of the ZC sequence whose root index is 1, and then generates the synchronization signal, where the synchronization signal includes the first signal and the second signal. That is, the generated synchronization signal includes the ZC sequence whose root index is 1 and the conjugate sequence of the ZC sequence whose root index is 1. The terminal device receives the synchronization signal according to a characteristic of the ZC sequence whose root index is 1, and the terminal device may perform, according to the synchronization signal and an auto-correlation and a frequency offset resistance characteristic of the ZC sequence whose root index is 1, the symbol timing synchronization and the carrier frequency synchronization in the case of a large frequency offset, thereby completing synchronization work of an M2M communications system in the case of the large frequency offset.

As described above, in step 401, the provided ZC sequence whose root index is 1 may be:

$$zc_1(n)=e^{-j\pi n(n+1+2q)/L}.$$

As described above, the conjugate sequence of the ZC sequence whose root index is 1 may be:

$$zc_2(n)=e^{j\pi n(n+1+2q)/L}$$

where L>0 is a sequence length, n=0, 1, ..., L−1, and q is any integer.

For example, in step 401, a method for obtaining the first signal after performing DFT and OFDM modulation on the ZC sequence whose root index is 1 may include the following steps.

(a1) Divide the ZC sequence whose root index is 1 into N subsequences, so that after being spliced, the N subsequences are still equal to the ZC sequence whose root index is 1. For ease of description, the ZC sequence whose root index is 1 is referred to as PS in the following, and if the N subsequences are $P_{seq}^{i}$ (i=1, 2, ..., N), PS=[$P_{seq}^{1}$, $P_{seq}^{2}$, ..., $P_{seq}^{N}$] is met, where N is a positive integer greater than or equal to 1.

(a2) Perform discrete Fourier transform on each subsequence $P_{seq}^{i}$ (i ∈ [1, N]) to obtain a corresponding frequency subdomain signal $P_{freq}^{i}$ (i ∈ [1,N]).

(a3) Perform inverse discrete Fourier transform on each frequency subdomain signal $P_{freq}^{i}$ (i ∈ [1,N]) to obtain each corresponding time subdomain signal $P_{time}^{i}$ (i ∈ [1,N]).

Specifically, inverse discrete Fourier transform may be directly performed on the corresponding frequency subdomain signal, or zero may be first added to the frequency subdomain signal, and then inverse discrete Fourier transform may be performed, so as to quickly implement inverse Fourier transform, and reduce hardware complexity.

(a4) Add a cyclic prefix (Cyclic Prefix, CP) to each time subdomain signal $P_{time}^{i}$ (i ∈ [1,N]) to obtain a corresponding sub-signal $P^i$ (i ⊔ [1,N]).

Specifically, the CP is added to $P_{time}^{i}$, that is, a segment of a trailer of $P_{time}^{i}$ is added to a front of a header. For example, $P_{time}^{i}=\{p_1, p_2, \ldots, p_U\}$ is set, and U is a quantity of symbols (or sampling points) in a signal. If a to-be-added CP length is C, the sub-signal is $P^i=\{p_{U-C+1}, \ldots, p_U, p_1, p_2, \ldots, p_U\}$ after the CP is added to $P_{time}^{i}$.

It should be specially noted that, a CP adding method in LTE is used as an example herein. Adding the CP by using another method or skipping adding a CP shall fall within the protection scope of the present invention provided that $P^i$ can be obtained, and details are not described herein.

(a5) Splice all sub-signals $P^i$ (i ∈ [1, N]) obtained in step a4 to obtain the first signal.

For example, the first signal may be represented as P, and $P[P^1, P^2, \ldots, P^N]$. For example, when N=2, $P^1=\{-1,1\}$, $P^2=\{1,1\}$, and $P=[P^1, P^2]=\{-1,1,1,1\}$.

For another example, in step 402, steps b1 to b5 of obtaining the second signal after performing DFT and OFDM modulation on the conjugate sequence of the ZC sequence whose root index is 1 are similar to steps a1 to a5 of obtaining the first signal, and a difference is that the ZC sequence whose root index is 1 needs to be replaced with the conjugate sequence of the ZC sequence whose root index is 1, and details are not described herein again.

For another example, in step 401, a method for obtaining the first signal after performing OFDM modulation on the ZC sequence whose root index is 1 may include the following steps:

(c1) Perform inverse discrete Fourier transform on the ZC sequence whose root index is 1 to obtain a corresponding time-domain signal.

For example, inverse discrete Fourier transform may be directly performed on the ZC sequence whose root index is 1, or zero may be first added to the ZC sequence whose root index, and then inverse discrete Fourier transform may be performed, so as to quickly implement inverse Fourier transform, and reduce hardware complexity.

(c2) Add a CP to the time-domain signal to obtain the first signal.

For another example, in step 402, steps d1 and d2 of obtaining the second signal after performing OFDM modulation on the conjugate sequence of the ZC sequence whose root index is 1 are similar to steps c1 and c2 of obtaining the first signal, and a difference is that the ZC sequence whose root index is 1 is replaced with the conjugate sequence of the ZC sequence whose root index is 1. For brevity, details are not described herein again.

Figure 6A:
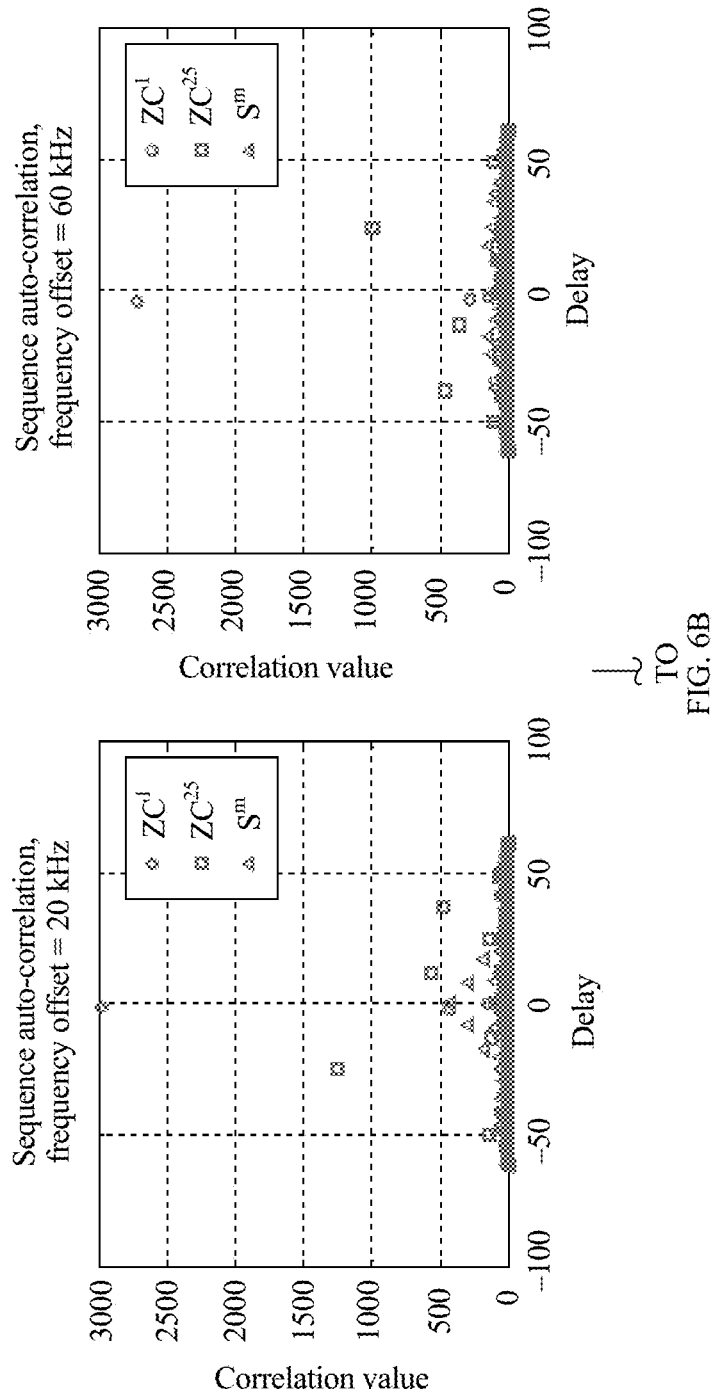
FIG. 6A and FIG. 6B show an auto-correlation comparison of three sequences in the case of different frequency offsets according to an embodiment of the present invention.
Figure 6B:
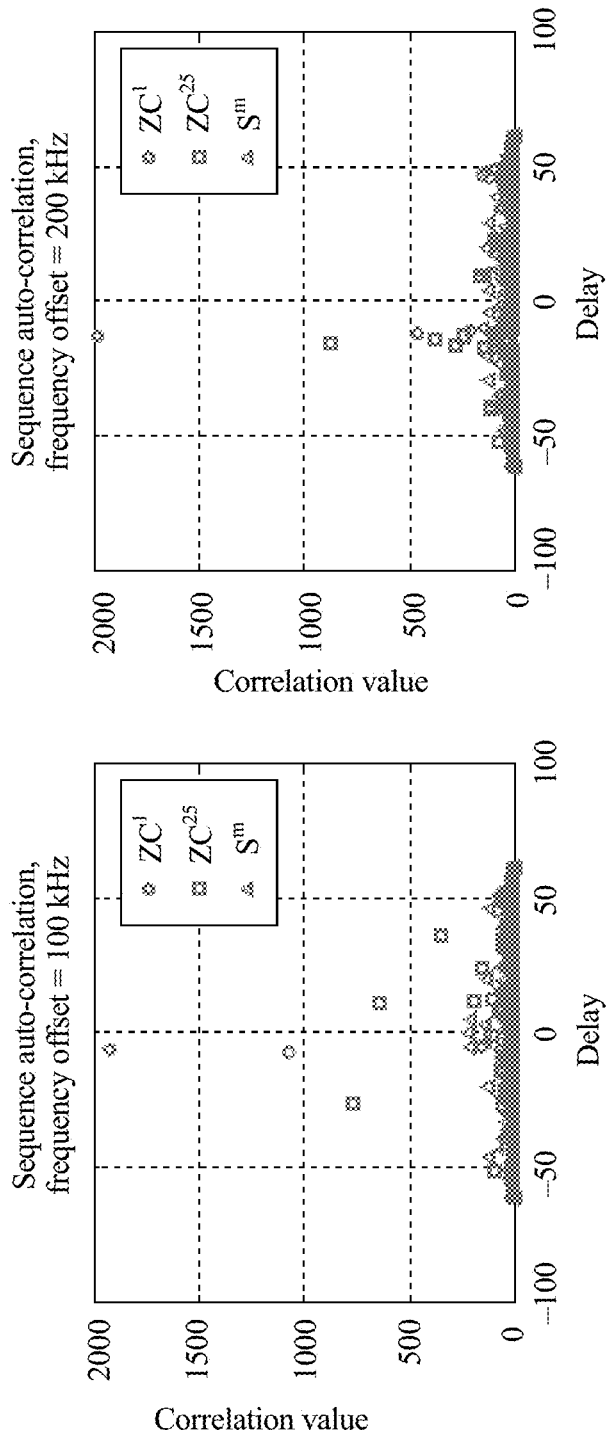

It should be specially noted that, the ZC sequence whose root index is 1 in this embodiment of the present invention is less affected by a frequency offset than another sequence with an auto-correlation, and still has a relatively obvious correlation peak in a scenario of a relatively large frequency offset. Compared with a sequence with the auto-correlation in the prior art, the ZC sequence whose root index is 1 can be better applicable to an application scenario of a large frequency offset. As shown in FIG. 6A and FIG. 6B, a sequence with a length of 62 is used as an example, and three sequences are selected. A first sequence is a ZC sequence whose root index is 25 in LTE, and is recorded as $ZC^{(25)}$. A second sequence is the ZC sequence whose root index is 1 used in the present invention, and is recorded as $ZC^{(1)}$. A third sequence is another pseudo-random sequence with the auto-correlation, for example, an m sequence, and is recorded as $S^m$. A synchronization signal generation manner in LTE is used as an example, and a sampling frequency is 960 kHz. It may be learned that, in the case of provided frequency offsets, the ZC sequence whose root index is 1 has an obvious correlation peak, but correlation peaks of other two sequences are not obvious when a frequency offset is relatively large.

In addition, the ZC sequence whose root index is 1 further has a good characteristic, that is, a location in which the correlation peak of the ZC sequence occurs is in a one-to-one correspondence with a frequency offset size. It may be seen from FIG. 6A and FIG. 6B that, for the ZC sequence whose root index is 1 selected in the present invention, when the frequency offset exists, the auto-correlation peak of the sequence does not occur in a location of "0" (that is, a location of no delay), but is offset to different locations with different frequency offsets.

Figure 7:
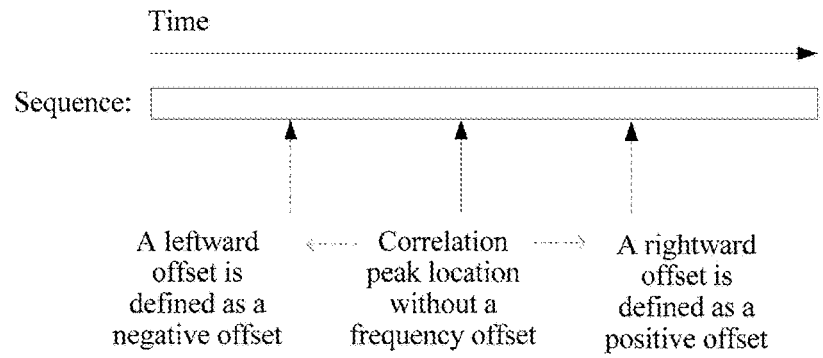
FIG. 7 is a schematic diagram of an auto-correlation peak offset definition according to an embodiment of the present invention.

In conclusion, it is assumed that a length of the ZC sequence whose root index is 1 is L, where L is a positive integer, and when a sampling rate is represented by FS and the frequency offset is represented by FO, an offset of an auto-correlation peak location, relative to a theoretical location, of the ZC sequence whose root index is 1 is:

$$\frac{|FO|}{FS}L$$

sampling points. With respect to a direction of the offset, if the sequence is arranged from left to right in the time domain, a left side represents a previous moment and a right side represents a next moment. For ease of quantization, a rightward offset may be defined as a positive offset, and a leftward offset may be defined as a negative offset. A specific case is shown in FIG. 7.

In another possible design, as shown in steps a1 to a5, when the ZC sequence whose root index is 1 is generated in the time domain, the offset value is $$\frac{FO}{FS}L,$$

that is, if the frequency offset FO is positive, the offset is the rightward offset, and if the frequency offset FO is negative, the offset is the leftward offset. As shown in steps c1 and c2, if the sequence is generated in the frequency domain, the offset value is $$\frac{-FO}{FS}L,$$

that is, if the frequency offset FO is positive, the offset is the leftward offset, and if the frequency offset FO is negative, the offset is the rightward offset.

In another possible design, the offset of the auto-correlation peak location, relative to a start location, of the ZC sequence whose root index is 1 and an offset of the auto-correlation peak location, relative to a start location, of the conjugate sequence of the ZC sequence whose root index is 1 are the same in size and opposite in direction.

However, as described above, the auto-correlation peak location of the ZC sequence whose root index is 1 has different offsets with different frequency offsets, but this characteristic alone is insufficient to implement the symbol timing synchronization, because if the synchronization signal includes only the ZC sequence whose root index is 1, after receiving the ZC sequence whose root index is 1, the terminal device performs sliding auto-correlation, and detects the correlation peak. However, a location of the correlation peak is offset, and the terminal device does not know the offset value and therefore cannot determine the start location of the signal. Therefore, assistance of the ZC conjugate sequence whose root index is 1 is needed.

Figure 8:
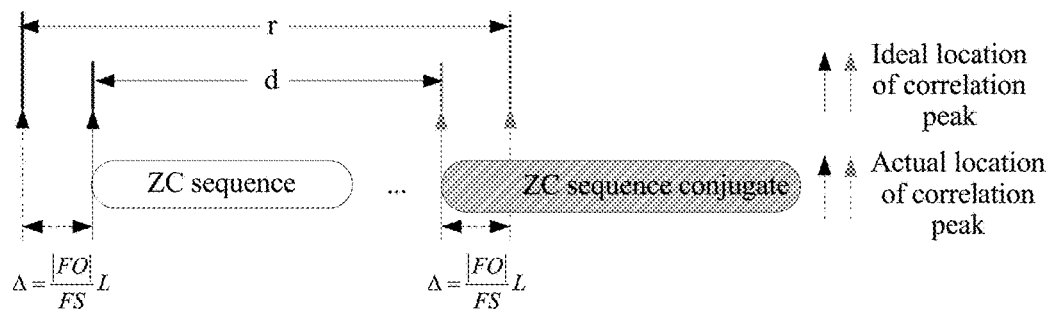
FIG. 8 is a schematic diagram of an auto-correlation peak location of a ZC sequence whose root index is 1 and an auto-correlation peak location of a conjugate sequence of the ZC sequence whose root index is 1 according to an embodiment of the present invention.

The conjugate sequence of the ZC sequence whose root index is 1 in this embodiment of the present invention has a similar characteristic to the ZC sequence whose root index is 1, and an offset of an auto-correlation peak and the offset of the sequence are the same in size, but are opposite in direction. As shown in FIG. 8, the ZC sequence whose root index is 1 and the conjugate sequence of the ZC sequence whose root index is 1 jointly form the synchronization signal. Due to impact of the frequency offset, the auto-correlation peak, relative to the theoretical location, of the ZC sequence whose root index is 1 is offset leftwards by Δ, and the auto-correlation peak, relative to the theoretical location, of the conjugate sequence of the ZC sequence whose root index is 1 is offset rightwards by Δ, where d is a distance between the ZC sequence whose root index is 1 and the conjugate sequence of the ZC sequence whose root index is 1 in the time domain, and d is a determined and known parameter, and r is a time domain distance between two auto-correlation peaks detected by the terminal device. After performing the sliding correlation on the received signal in turn by locally using the ZC sequence whose root index is 1 and the conjugate sequence of the ZC sequence whose root index is 1, the terminal device can learn a value of r, that is, r is known to the terminal device, but the frequency offset is unknown. Therefore, Δ is unknown. However, Δ meets an equation: r=d+2Δ, so that $$\Delta = \frac{r - d}{2}$$

can be obtained, and there is a distance Δ between the start location of the ZC sequence whose root index is 1 and an actual location of the correlation peak of the ZC sequence whose root index is 1, so that the start location may be obtained by using the actual location and Δ, so as to complete the symbol timing synchronization.

Further, after the symbol timing is completed, a value of the frequency offset FO may be calculated according to a relationship between Δ and the frequency offset FO, so as to complete the carrier frequency synchronization.

Therefore, the UE may complete synchronization work by using the synchronization signal that includes the ZC sequence whose root index is 1 and the conjugate sequence of the ZC sequence whose root index is 1.

It should be specially noted that in this embodiment of the present invention, the synchronization signal may be generated by using a method of DFT plus OFDM. In this method, the synchronization signal is generated in the time domain, first transformed to the frequency domain by means of DFT, and then modulated into the time-domain signal by means of OFDM. Therefore, the synchronization signal may occupy a plurality of OFDM symbols without losing a correlation of a sequence (because the synchronization signal is generated in the time domain). However, an existing LTE synchronization signal is generated in the frequency domain, and to avoid losing the correlation, only one OFDM symbol can be occupied. The correlation is lost once a plurality of OFDM symbols are occupied. Therefore, in the present invention, because a frequency resource of an M2M system is limited, the original synchronization sequence may be first segmented, and then transformed to the frequency domain by means of DFT, so that the synchronization signal may occupy a plurality of OFDM symbols.

It should be specially noted that in this embodiment of the present invention, the synchronization signal may be generated by using a method of OFDM. In this method, the synchronization signal is generated in the frequency domain and then transformed into the time-domain signal by means of IDFT. In this case, because the synchronization sequence is generated in the frequency domain, the synchronization sequence can occupy only one OFDM symbol. If the frequency resource of the M2M system is limited, making that one OFDM symbol cannot accommodate the synchronization sequence, a subcarrier spacing of the synchronization signal may be reduced. In this way, one OFDM symbol may accommodate a longer sequence, but if the M2M system is deployed in an LTE frequency band, a change of the subcarrier spacing may cause interference to a conventional LTE signal. In this case, an extra guard band needs to be reserved to suppress the interference.

In step 106, that the terminal device performs symbol timing synchronization and carrier frequency synchronization according to the ZC sequence whose root index is 1, the conjugate sequence of the ZC sequence whose root index is 1, and the synchronization signal may include the following steps.

(e1) Perform sliding correlation on the synchronization signal by using the ZC sequence whose root index is 1, and obtain a first sliding correlation peak; perform sliding correlation on the synchronization signal by using the conjugate sequence of the ZC sequence whose root index is 1, and obtain a second sliding correlation peak.

(e2) Determine a middle point location between a location of the first sliding correlation peak and a location of the second sliding correlation peak; determine a distance between an ideal start location of the first signal and an ideal start location of the second signal.

It should be specially noted that, the distance between the ideal start location of the first signal and the ideal start location of the second signal is fixed in a protocol, and is known to the terminal device.

(e3) Determine the start location of the first signal according to the middle point location and the distance.

For example, the start location of the first signal may be equal to the middle point location minus half of the distance.

(e4) Determine a carrier frequency offset value according to the location of the first sliding correlation peak and the start location of the first signal, and complete the carrier frequency synchronization.

In step e4, the offset of the correlation peak location, relative to the start location, of the ZC sequence whose root index is 1 is in a one-to-one correspondence with the frequency offset that the ZC sequence whose root index is 1 undergoes, and the offset of the correlation peak location, relative to the start location, of the conjugate sequence of the ZC sequence whose root index is 1 is in a one-to-one correspondence with the frequency offset that the conjugate sequence of the ZC sequence whose root index is 1 undergoes. The start location of the first signal is obtained by using step e3, and the location of the first sliding correlation peak is obtained by using step e1. Therefore, the offset is obtained according to the start location of the first signal and the location of the first sliding correlation peak. The frequency offset value may be determined according to the offset and with reference to the foregoing one-to-one correspondence between the offset of the correlation peak location relative to the start location and the frequency offset, thereby completing the carrier frequency synchronization.

Figure 9:
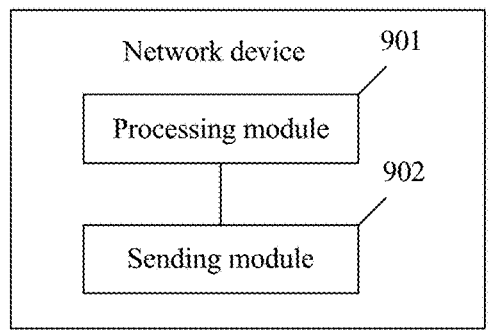
FIG. 9 is a schematic structural diagram of a network device according to an embodiment of the present invention.

As shown in FIG. 9, an embodiment of the present invention provides a schematic structural diagram of a network device. The network device may be configured to execute the method shown in FIG. 4, and the network device includes:

a processing module 901, configured to: obtain a first signal after performing discrete Fourier transform DFT and orthogonal frequency division multiplexing OFDM modulation, or OFDM modulation on a ZC sequence whose root index is 1, obtain a second signal after performing DFT and OFDM modulation, or OFDM modulation on a conjugate sequence of the ZC sequence whose root index is 1, and generate a synchronization signal, where the synchronization signal includes the first signal and the second signal; and a sending module 902, configured to send, to a terminal device, the synchronization signal generated by the processing module 901.

A beneficial effect of this embodiment of the present invention is similar to a beneficial effect of the method embodiment shown in FIG. 4, and details are not described herein again.

The processing module is specifically configured to: divide the ZC sequence whose root index is 1 into N subsequences, perform DFT and OFDM modulation on each of the N subsequences, and splice the modulated N subsequences into the first signal.

A manner of obtaining the first signal by the processing module is similar to the obtaining manner in the foregoing method embodiment, and details are not described herein again.

Discrete Fourier transform is performed on each subsequence to obtain a frequency subdomain signal corresponding to each subsequence.

The processing module is specifically configured to: divide a conjugate sequence of the ZC sequence whose root index is 1 into N subsequences, perform DFT and OFDM modulation on each of the N subsequences, and splice the modulated N subsequences into the second signal.

A manner of obtaining the second signal by the processing module is similar to the obtaining manner in the foregoing method embodiment, and details are not described herein again.

The processing module is specifically configured to: perform inverse discrete Fourier transform on the conjugate sequence of the ZC sequence whose root index is 1 to obtain a corresponding time-domain signal; and add a CP to the time-domain signal to obtain the second signal.

Figure 10:
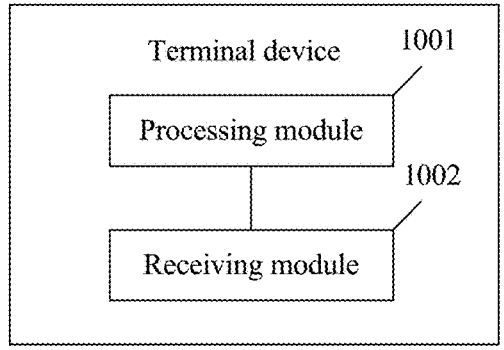
FIG. 10 is a schematic structural diagram of a terminal device according to an embodiment of the present invention.

As shown in FIG. 10, an embodiment of the present invention provides a schematic structural diagram of a terminal device. The terminal device may be configured to execute the method shown in FIG. 4, and the terminal device includes:

a receiving module 1001, configured to receive a synchronization signal sent by a network device, where the synchronization signal includes a first signal and a second signal, the first signal is obtained after the network device performs discrete Fourier transform DFT and orthogonal frequency division multiplexing OFDM modulation, or OFDM modulation on a ZC sequence whose root index is 1, and the second signal is obtained after the network device performs DFT and OFDM modulation, or OFDM modulation on a conjugate sequence of the ZC sequence whose root index is 1; and a processing module 1002, configured to perform symbol timing synchronization and carrier frequency synchronization according to the ZC sequence whose root index is 1, the conjugate sequence of the ZC sequence whose root index is 1, and the synchronization signal.

The processing module is specifically configured to: perform sliding correlation on the synchronization signal by using the ZC sequence whose root index is 1, and obtain a first sliding correlation peak; perform sliding correlation on the synchronization signal by using the conjugate sequence of the ZC sequence whose root index is 1, and obtain a second sliding correlation peak; determine a start location of the first signal according to a location of the first sliding correlation peak and a location of the second sliding correlation peak, and complete the symbol timing synchronization; and determine a carrier frequency offset value according to the location of the first sliding correlation peak and the start location of the first signal, and complete the carrier frequency synchronization.

That the processing module determines a start location of the first signal according to a location of the first sliding correlation peak and a location of the second sliding correlation peak is specifically: determining a middle point location between the location of the first sliding correlation peak and the location of the second sliding correlation peak; determining a distance between an ideal start location of the first signal and an ideal start location of the second signal; and determining the start location of the first signal according to the middle point location and the distance.

For a beneficial effect of this embodiment of the present invention, refer to a beneficial effect of the method embodiment shown in FIG. 4, and details are not described herein again.

It should be specially noted that FIG. 9 shows a possible schematic structural diagram of the network device provided in the foregoing embodiment, and the network device includes the processing module and the sending module. It should be specially noted that, an entity device corresponding to the processing module provided in this embodiment of the present invention may be a processor, and an entity device corresponding to the sending module provided in this embodiment of the present invention may further be a transmitter. It may be understood that the processor and the transmitter merely show a simplified design of the network device. In an actual application, the network device may include any quantity of transceivers, processors, controllers, memories, and the like, and all network devices that can implement the present invention fall within the protection scope of the present invention.

It should be specially noted that FIG. 10 shows a possible schematic structural diagram of the terminal device provided in the foregoing embodiment, and the terminal device includes the processing module and the receiving module. It should be specially noted that, an entity device corresponding to the processing module provided in this embodiment of the present invention may be a processor, and an entity device corresponding to the receiving module provided in this embodiment of the present invention may further be a receiver. It may be understood that the processor and the receiver merely show a simplified design of the terminal device. In an actual application, the terminal device may include any quantity of transceivers, processors, controllers, memories, and the like, and all terminal devices that can implement the present invention fall within the protection scope of the present invention.

It should be specially noted that the following operations may be completed by the processing module.

It should be specially noted that an M2M system may be deployed in a spectrum of an existing communications system (for example, LTE), and a series of methods need to be used to avoid relatively strong interference to an LTE signal. For example, the interference to the LTE signal may be avoided by using a same OFDM modulation scheme as LTE, a subcarrier spacing, and a CP adding rule, and the like. Therefore, a CP needs to be added to an M2M synchronization signal.

Figure 11:
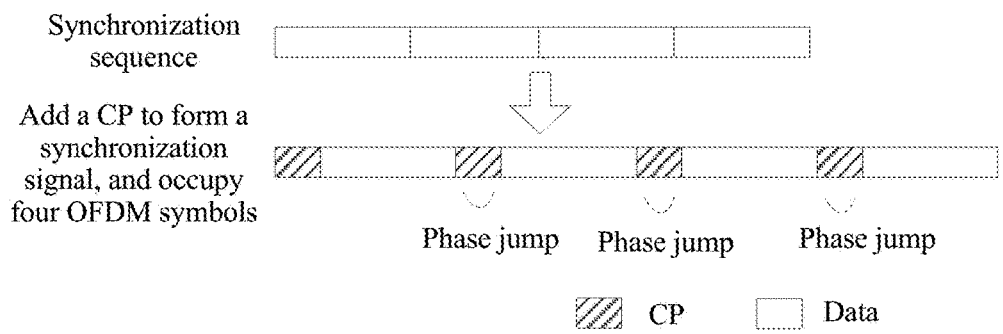
FIG. 11 is a schematic diagram in which a synchronization signal generates a phase jump at a CP according to an embodiment of the present invention.

Because of needing to face a low signal-to-noise ratio environment, the M2M synchronization signal usually occupies a plurality of OFDM symbols to increase a signal-to-noise ratio. Due to impact of a frequency offset, the M2M synchronization signal generates a phase jump at the CP. As shown in FIG. 11, the synchronization signal occupies four OFDM symbols. Due to the impact of the frequency offset, except a CP of a first OFDM symbol, three other CPs cause the synchronization sequence to generate a phase jump, affecting synchronization performance.

Figure 12:
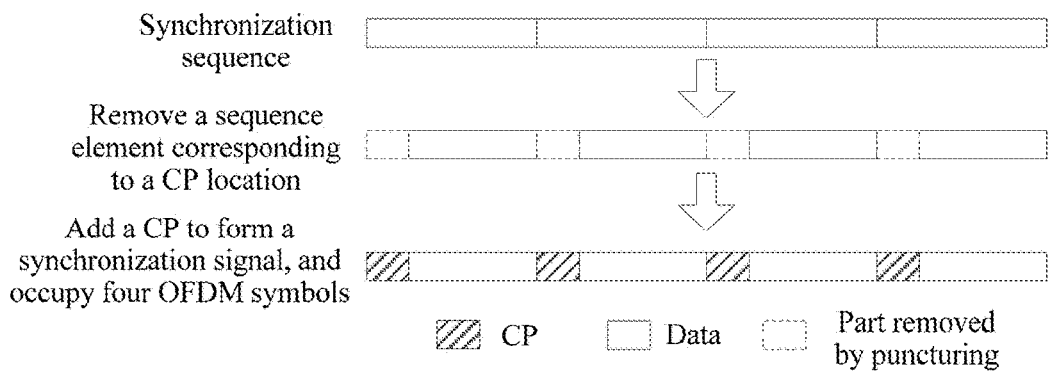
FIG. 12 is a schematic diagram of an occupied OFDM symbol by adding a CP to form a synchronization signal according to an embodiment of the present invention.

Therefore, before the first signal is obtained, a puncturing operation is performed on the ZC sequence whose root index is 1, to avoid the above-described technical problem. As shown in FIG. 12, a corresponding synchronization sequence is first generated according to a total length including the CP, an element in a CP location is removed by means of puncturing, and then the CP is added. In this way, when a receive end performs synchronization by using the synchronization signal, a corresponding sequence element at the CP location is only missing in the synchronization signal. It can be proved by means of simulation that performance is better than the phase jump shown in FIG. 11.

Figure 13:
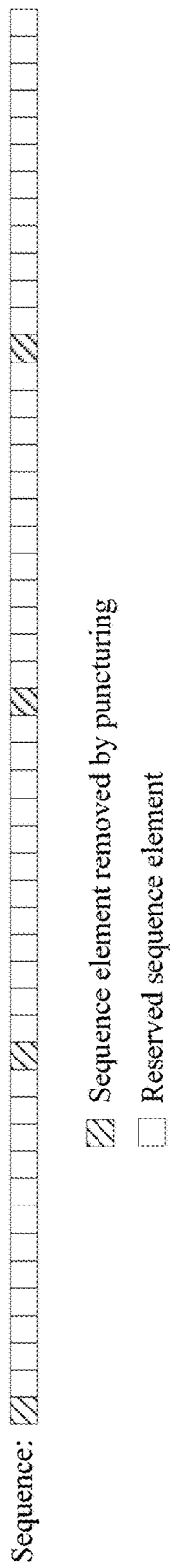
FIG. 13 is a schematic diagram of puncturing according to an embodiment of the present invention.

It should be specially noted that the puncturing operation on the ZC sequence whose root index is 1 may be removing some sequence elements according to a specific puncturing rule, for example, the puncturing operation may be directly performed on a baseband sequence. As shown in FIG. 13, after a ZC sequence $zc_1, zc_2, \ldots, zc_N$ whose root index is 1 is generated, puncturing is directly performed, that is, corresponding puncturing is performed according to a rule of removing one sequence element out of every 13 sequence elements.

For example, the puncturing operation may also be performed on an over-sampling sequence of the sequence. After the ZC sequence $zc_1, zc_2, \ldots, zc_N$ whose root index is 1 is generated, over-sampling is first performed on the sequence, an over-sampling sequence $sp_1, sp_2, \ldots, sp_M$ (M>N) is obtained, and a puncturing operation of a corresponding location is performed on the over-sampling sequence.

It should be specially noted that the foregoing is merely an example of the present invention, and the present invention includes but is not limited thereto.

For the puncturing on the over-sampling, a quantity of sampling points removed by puncturing is not an integer multiple of an over-sampling multiple. Therefore, the puncturing operation can be performed only after the sequence is oversampled by a specific multiple.

For example, the M2M system has system bandwidth of 180 kHz, and is deployed in an LTE band. A downlink uses an OFDM modulation technology, the subcarrier spacing is 15 kHz, and a quantity of downlink subcarriers is 180 kHz/15 kHz=12. The synchronization signal is the ZC sequence, and occupies last nine symbols of a subframe. In LTE, in a common CP scenario, a ratio of the CP to a data symbol is 10/138 (a first symbol) and 9/137 (not the first symbol); and in an extended CP scenario, a ratio of the CP to the data symbol is 1/5. Because the synchronization signal occupies the last nine symbols of the subframe, CP ratios of the M2M synchronization signal are respectively 9/137 (the common CP) and 1/5 (the extended CP).

The common CP is used as an example. According to the foregoing description, the synchronization sequence needs to be generated according to a sequence length including the CP, and the sequence length may be (12×9)/(1−9/137)=115.6, that is, 116. Therefore, a length of the baseband sequence is 116. Considering a sampling rate of 1.92 M, a quantity of subcarriers is 1.92 M/15 k=128, plus the CP of 9 sampling points. Therefore, a quantity of sampling points of one symbol is 137, and the nine symbols have 137×9=1233 sampling points in total. An obtained quantity of sampling points of the synchronization signal at the 1.92 M sampling rate is 1233 points.

Therefore, a first step is to generate a ZC sequence with a length of 116 as a baseband sequence.

A second step is to perform over-sampling on the baseband sequence, and the baseband sequence with the length of 116 is oversampled to 1.92 MHz, and a sampling point sequence with a length of 1233 is obtained. An over-sampling method may use a DFT method. DFT is performed on the baseband sequence with the length of 116, and then zero is added to both sides of an obtained sequence, so that a total length is 1233, and then IDFT is performed to obtain the sampling point sequence with the length of 1233.

A third step is puncturing, and a part corresponding to the CP location is removed. Because the ratio of the CP to one data symbol is 9/137, the sampling point sequence with the length of 1233 is equally divided into nine groups. Each group includes 137 sampling points, and then the first nine samples in each group are removed, so that each group includes the remaining 128 sampling points, and a length of a punctured sampling point sequence is 128×9=1152.

After puncturing, DFT and OFDM modulation can be performed.

Specifically, the sampling point sequence with the length of 1152 is divided into nine groups, each group includes 128 sampling points, and DFT is performed on 128 sampling points in each group. The M2M occupies 180 kHz bandwidth and needs to keep orthogonal to LTE. Therefore, middle 12 of the 128 subcarriers may be reserved, and remaining subcarriers need to be set to zero. Then, IDFT is performed on 128 sampling points, and the CP of 9 sampling points is added, to obtain 137 sampling points. The obtained 137 sampling points in each group after the foregoing process are spliced. Therefore, the synchronization signal after DFT and OFDM modulation is the sampling point sequence with the length of 137×9=1233.

Then, the extended CP is used as an example. According to the foregoing description, the synchronization sequence needs to be initially generated according to a sequence length including the CP. Therefore, the sequence length should be (12×9)/(1−1/5)=135, which is an integer, and does not need to be rounded off. Therefore, in principle, puncturing needs to be performed only on the baseband. Specific steps are as follows:

A first step is to generate a ZC sequence with a length of 135 as a baseband synchronization sequence.

A second step is puncturing, and the sequence with the length of 135 is divided into nine groups and each group includes 15 sequence elements. Because the CP occupies 1/5 of the data symbol, the first three elements in each group are removed, and 12 sequence elements are left. A sequence length after puncturing is changed to 12×9=108.

Specifically, the sequence with the length of 108 is divided into nine groups, and each group includes 12 sequence elements. DFT is performed on 12 elements in each group, and then zero is equally added to both sides, so that a length after zero is added is 128. Then, IDFT is performed on a zero-added sequence, and the CP of 32 sampling points is added, to obtain 160 sampling points. The obtained 160 sampling points in each group after the foregoing process are spliced. Therefore, the synchronization signal after DFT and OFDM modulation is the sampling point sequence with the length of 160×9=1440.

The foregoing separately uses the common CP and the extended CP as an example, to describe a method for generating the synchronization signal that includes puncturing. The common CP is first to perform the over-sampling on the sequence, and then perform the puncturing. The extended CP is to directly perform the puncturing on the baseband sequence. In practice, to reduce a quantity of blind detection times of UE and reduce complexity, a same puncturing manner may be performed on the common CP and the extended CP. In addition, original synchronization sequences used by the common CP and the extended CP may be the same. The UE does not need to distinguish the common or the extended CP at a receive end, and permanently receives the synchronization signal directly according to one of the modes. Certainly, there is a particular performance loss. However, simulation proves that the loss is not large, but complexity of the UE can be reduced, because the synchronization complexity of the UE is extremely limited in the M2M system.

Figure 14:
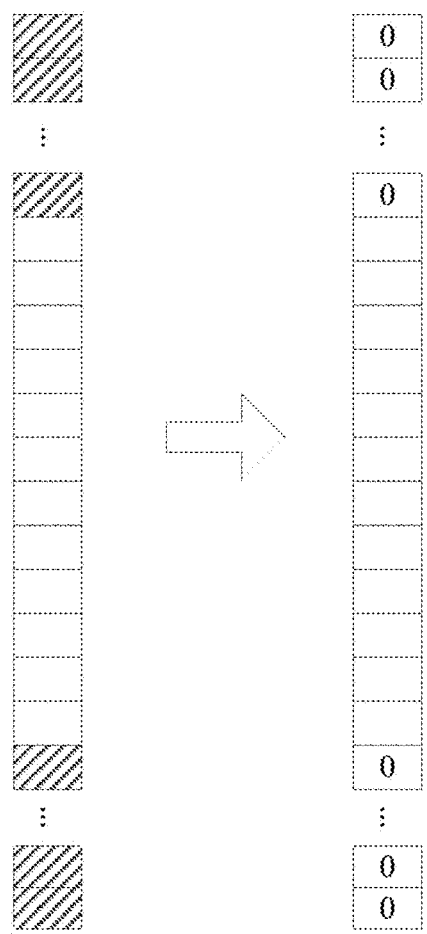
FIG. 14 is a schematic diagram in which a signal uses OFDM modulation according to an embodiment of the present invention.

Because the M2M system may be deployed in a frequency band of LTE, an M2M signal needs to be orthogonal to an LTE signal. As shown in FIG. 14, the signal uses the OFDM modulation and occupies 180 kHz bandwidth, and the subcarrier spacing is 15 kHz. In the foregoing examples, a length of a frequency domain sequence obtained after DFT is performed on the signal is 128. Before IDFT is performed on the frequency domain sequence, points other than middle 12 points in the sequence with the length of 128 need to be set to zeros. Because the signal occupies only middle 180 kHz, that is, the middle 12 subcarriers, locations of other subcarriers need to be set to zeros.

Steps of the methods or algorithms described with reference to the content disclosed in the present invention may be implemented by using hardware, or may be implemented in a manner of executing a software instruction by a processor. The software instruction may include a corresponding software module, and the software module may be located in a RAM memory, a flash memory, a ROM memory, an EPROM memory, an EEPROM memory, a register, a hard disk, a removable hard disk, a CD-ROM, or any other form of storage medium known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in user equipment. Certainly, the processor and the storage medium may exist in the user equipment as discrete components.

A person skilled in the art should be aware that in the foregoing one or more examples, functions described in the present invention may be implemented by hardware, software, firmware, or any combination thereof. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a general-purpose or dedicated computer.

The objectives, technical solutions, and benefits of the present invention are further described in detail in the foregoing specific implementations. It should be understood that the foregoing descriptions are merely specific implementations of the present invention, but are not intended to limit the protection scope of the present invention. Any modification, equivalent replacement, or improvement made within the spirit and principle of the present invention shall fall within the protection scope of the present invention.

What is claimed is:

1. A synchronization signal sending method, comprising:
    obtaining, by a network device, a first signal after performing discrete Fourier transform (DFT) and orthogonal frequency division multiplexing (OFDM) modulation, or OFDM modulation on a Zadoff-Chu (ZC) sequence whose root index is 1;
    obtaining, by the network device, a second signal after performing DFT and OFDM modulation, or OFDM modulation on a conjugate sequence of the ZC sequence whose root index is 1;
    generating, by the network device, a synchronization signal, wherein the synchronization signal comprises the first signal and the second signal; and
    sending, by the network device, the synchronization signal to a terminal device.

2. The method according to claim 1, wherein the obtaining, by a network device, a first signal after performing DFT and OFDM modulation on a ZC sequence whose root index is 1 comprises:
    dividing the ZC sequence whose root index is 1 into N sub sequences;
    performing DFT and OFDM modulation on each of the N subsequences; and
    splicing the modulated N subsequences into the first signal.

3. The method according to claim 2, wherein the performing DFT and OFDM modulation on each of the N subsequences, and splicing the modulated N subsequences into the first signal comprises:
    performing DFT on each subsequence to obtain a frequency subdomain signal corresponding to each subsequence;
    performing inverse DFT on the frequency subdomain signal corresponding to each subsequence to obtain a time subdomain signal corresponding to each frequency subdomain signal;
    adding a cyclic prefix (CP) to the time subdomain signal corresponding to each frequency subdomain signal to obtain a sub-signal corresponding to each time subdomain signal; and splicing the sub-signals corresponding to the N time subdomain signals into the first signal.

4. The method according to claim 1, wherein before the obtaining a first signal, the method further comprises:
performing a puncturing operation on the ZC sequence whose root index is 1.

5. The method according to claim 4, wherein the performing a puncturing operation on the ZC sequence whose root index is 1 comprises:
removing one or more sequence elements of the ZC sequence whose root index is 1.

6. The method according to claim 1, wherein the obtaining, by a network device, a first signal after performing OFDM modulation on a ZC sequence whose root index is 1 comprises:
performing inverse (DFT) on the ZC sequence whose root index is 1 to obtain a corresponding time-domain signal; and
adding a CP to the time-domain signal to obtain the first signal.

7. The method according to claim 1, wherein the obtaining, by the network device, a second signal after performing DFT and OFDM modulation on a conjugate sequence of the ZC sequence whose root index is 1 comprises:
dividing the conjugate sequence of the ZC sequence whose root index is 1 into N sub sequences;
performing DFT and OFDM modulation on each of the N subsequences; and
splicing the modulated N subsequences into the second signal.

8. The method according to claim 1, wherein before the obtaining a second signal, the method further comprises:
performing a puncturing operation on the conjugate sequence of the ZC sequence whose root index is 1.

9. The method according to claim 1, wherein the obtaining, by the network device, a second signal after performing OFDM modulation on a conjugate sequence of the ZC sequence whose root index is 1 comprises:
performing inverse (DFT) on the conjugate sequence of the ZC sequence whose root index is 1 to obtain a corresponding time-domain signal; and
adding a CP to the time-domain signal to obtain the second signal.

10. A synchronization signal receiving method, comprising:
receiving, by a terminal device, a synchronization signal sent by a network device, wherein the synchronization signal comprises a first signal and a second signal, the first signal is obtained after the network device performs discrete Fourier transform (DFT) and orthogonal frequency division multiplexing (OFDM) modulation, or OFDM modulation on a Zadoff-Chu (ZC) sequence whose root index is 1, and the second signal is obtained after the network device performs DFT and OFDM modulation, or OFDM modulation on a conjugate sequence of the ZC sequence whose root index is 1; and
performing, by the terminal device, symbol timing synchronization and carrier frequency synchronization according to the ZC sequence whose root index is 1, the conjugate sequence of the ZC sequence whose root index is 1, and the synchronization signal.

11. The method according to claim 10, wherein the performing, by the terminal device, symbol timing synchronization and carrier frequency synchronization according to the ZC sequence whose root index is 1, the conjugate sequence of the ZC sequence whose root index is 1, and the synchronization signal comprises:
performing a first sliding correlation on the synchronization signal by using the ZC sequence whose root index is 1;
obtaining a first sliding correlation peak based on the first sliding correlation;
performing a second sliding correlation on the synchronization signal by using the conjugate sequence of the ZC sequence whose root index is 1;
obtaining a second sliding correlation peak based on the second sliding correlation;
determining a start location of the first signal according to a location of the first sliding correlation peak and a location of the second sliding correlation peak;
performing the symbol timing synchronization based on the start location of the first signal;
determining a carrier frequency offset value according to the location of the first sliding correlation peak and the start location of the first signal; and
performing the carrier frequency synchronization based on the carrier frequency offset.

12. The method according to claim 11, wherein the determining a start location of the first signal according to a location of the first sliding correlation peak and a location of the second sliding correlation peak comprises:
determining a middle point location between the location of the first sliding correlation peak and the location of the second sliding correlation peak;
determining a distance between an ideal start location of the first signal and an ideal start location of the second signal; and
determining the start location of the first signal according to the middle point location and the distance.

13. A network device, comprising:
at least one processor; and
a non-transitory computer-readable storage medium coupled to the at least one processor and storing programming instructions for execution by the at least one processor, the programming instructions instruct the at least one processor to:
obtain a first signal after performing discrete Fourier transform (DFT) and orthogonal frequency division multiplexing (OFDM) modulation, or OFDM modulation on a Zadoff-Chu (ZC) sequence whose root index is 1;
obtain a second signal after performing DFT and OFDM modulation, or OFDM modulation on a conjugate sequence of the ZC sequence whose root index is 1;
generate a synchronization signal, wherein the synchronization signal comprises the first signal and the second signal; and
send, to a terminal device using a transmitter, the synchronization signal.

14. The network device according to claim 13, wherein the programming instructions further instruct the at least one processor to:
divide the ZC sequence whose root index is 1 into N subsequences;
perform DFT and OFDM modulation on each of the N subsequences; and
splice the modulated N subsequences into the first signal.

15. The network device according to claim 14, wherein the performing DFT and OFDM modulation on each of the N subsequences, and splicing the modulated N subsequences into the first signal comprises:

performing DFT on each subsequence to obtain a frequency subdomain signal corresponding to each subsequence;

performing inverse DFT on the frequency subdomain signal corresponding to each subsequence to obtain a time subdomain signal corresponding to each frequency subdomain signal;

adding a cyclic prefix (CP) to the time subdomain signal corresponding to each frequency subdomain signal to obtain a sub-signal corresponding to each time subdomain signal; and splicing the sub-signals corresponding to the N time subdomain signals into the first signal.

16. The network device according to claim 13, wherein the programming instructions further instruct the at least one processor to:

perform inverse (DFT) on the ZC sequence whose root index is 1 to obtain a corresponding time-domain signal; and add a CP to the time-domain signal to obtain the first signal.

17. The network device according to claim 13, wherein the programming instructions further instruct the at least one processor to:

divide a conjugate sequence of the ZC sequence whose root index is 1 into N sub sequences;

perform DFT and OFDM modulation on each of the N subsequences; and splice the modulated N subsequences into the second signal.

18. A terminal device, comprising:

at least one processor; and a non-transitory computer-readable storage medium coupled to the at least one processor and storing programming instructions for execution by the at least one processor, the programming instructions instruct the at least one processor to:

receive a synchronization signal sent by a network device, wherein the synchronization signal comprises a first signal and a second signal, the first signal is obtained after the network device performs discrete Fourier transform (DFT) and orthogonal frequency division multiplexing (OFDM) modulation, or OFDM modulation on a Zadoff-Chu (ZC) sequence whose root index is 1, and the second signal is obtained after the network device performs DFT and OFDM modulation, or OFDM modulation on a conjugate sequence of the ZC sequence whose root index is 1; and perform symbol timing synchronization and carrier frequency synchronization according to the ZC sequence whose root index is 1, the conjugate sequence of the ZC sequence whose root index is 1, and the synchronization signal.

19. The terminal device according to claim 18, wherein the programming instructions further instruct the at least one processor to:

perform a first sliding correlation on the synchronization signal by using the ZC sequence whose root index is 1;

obtain a first sliding correlation peak based on the first sliding correlation;

perform a second sliding correlation on the synchronization signal by using the conjugate sequence of the ZC sequence whose root index is 1;

obtain a second sliding correlation peak based on the second sliding correlation;

determine a start location of the first signal according to a location of the first sliding correlation peak and a location of the second sliding correlation peak;

perform the symbol timing synchronization based on the start location of the first signal;

determine a carrier frequency offset value according to the location of the first sliding correlation peak and the start location of the first signal; and perform the carrier frequency synchronization based on the carrier frequency offset.

20. The terminal device according to claim 19, wherein the determining a start location of the first signal according to a location of the first sliding correlation peak and a location of the second sliding correlation peak comprises:

determining a middle point location between the location of the first sliding correlation peak and the location of the second sliding correlation peak;

determining a distance between an ideal start location of the first signal and an ideal start location of the second signal; and determining the start location of the first signal according to the middle point location and the distance.

* * * * *

UNITED STATES PATENT AND TRADEMARK OFFICE
CERTIFICATE OF CORRECTION

PATENT NO. : 10,362,548 B2
APPLICATION NO. : 15/933100
DATED : July 23, 2019
INVENTOR(S) : Tong Ji, Yiling Wu and Zhe Chen Page 1 of 1

It is certified that error appears in the above-identified patent and that said Letters Patent is hereby corrected as shown below:

In the Claims

Column 20, Lines 47-48, Claim 2, delete "sub sequences;" and insert -- subsequences; --, therefor.

Column 21, Line 26, Claim 7, delete "sub sequences;" and insert -- subsequences; --, therefor.

Column 23, Line 26, Claim 17, delete "sub sequences;" and insert -- subsequences; --, therefor.

Signed and Sealed this
Third Day of March, 2020

Andrei Iancu
*Director of the United States Patent and Trademark Office*